US011040748B1

(12) United States Patent
Steyn (10) Patent No.: US 11,040,748 B1
(45) Date of Patent: Jun. 22, 2021

(54) BICYCLE HEADLIGHT WITH LINEAR LED DEVICES AND RELATED METHODS

(71) Applicant: Dirk Steyn, Ocala, FL (US)

(72) Inventor: Dirk Steyn, Ocala, FL (US)

(*) Notice: Subject to any disclaimer, the term of this patent is extended or adjusted under 35 U.S.C. 154(b) by 0 days.

(21) Appl. No.: 16/997,030

(22) Filed: Aug. 19, 2020

(51) Int. Cl.
| | |
|---|---|
| *B62J 6/03* | (2020.01) |
| *B62J 6/029* | (2020.01) |
| *B62J 43/30* | (2020.01) |
| *B62J 6/16* | (2020.01) |
| *F21S 41/143* | (2018.01) |
| *F21V 29/75* | (2015.01) |
| *F21S 41/20* | (2018.01) |
| *F21V 21/088* | (2006.01) |
| *F21S 45/47* | (2018.01) |
| *F21W 107/13* | (2018.01) |

(52) U.S. Cl.
CPC .............. *B62J 6/03* (2020.02); *B62J 6/029* (2020.02); *B62J 6/16* (2013.01); *B62J 43/30* (2020.02); *F21S 41/143* (2018.01); *F21S 41/28* (2018.01); *F21S 41/285* (2018.01); *F21S 45/47* (2018.01); *F21V 21/088* (2013.01); *F21V 29/75* (2015.01); *F21W 2107/13* (2018.01)

(58) Field of Classification Search
CPC ....... B62J 6/029; B62J 6/03; B62J 6/16; B62J 43/30; F21S 41/143; F21S 41/28; F21S 41/285; F21S 45/47; F21V 29/75
See application file for complete search history.

(56) References Cited

U.S. PATENT DOCUMENTS

| | | | |
|---|---|---|---|
| 4,204,191 A | 5/1980 | Daniels | |
| 6,502,965 B1* | 1/2003 | Bradford | ................ F21V 7/10 362/277 |
| 6,834,986 B2 | 12/2004 | Tsukamoto | |
| 7,070,295 B1 | 7/2006 | Lee | |
| 7,410,278 B2 | 8/2008 | Kitamura | |
| 7,594,741 B2 | 9/2009 | Okajima et al. | |
| 7,621,549 B2 | 11/2009 | van Houweling | |
| 8,342,714 B1* | 1/2013 | Rea | ................ F21V 23/026 362/264 |
| 8,545,069 B2 | 10/2013 | McCaslin et al. | |
| 8,651,714 B1* | 2/2014 | Hamasaki | ................ B62J 6/02 362/473 |
| 10,100,989 B1 | 10/2018 | Hamasaki | |
| 10,131,392 B2 | 11/2018 | Emerson et al. | |
| RE47,688 E | 11/2019 | McCaslin et al. | |
| 2003/0128547 A1* | 7/2003 | Shoji | ................ F21S 43/26 362/475 |
| 2006/0002119 A1 | 1/2006 | Sharp | |
| 2007/0109803 A1 | 5/2007 | Chuang | |
| 2009/0207624 A1 | 8/2009 | Ma et al. | |
| 2012/0096978 A1 | 4/2012 | Voshell et al. | |

(Continued)

*Primary Examiner* — Thomas M Sember
(74) *Attorney, Agent, or Firm* — Allen, Dyer, Doppelt + Gilchrist, PA (57) ABSTRACT

A bicycle headlight is to be coupled to a handlebar of a bicycle. The bicycle headlight also may include an elongate housing having a first end and a second end opposite the first end, and LED devices carried by the elongate housing and being aligned in a pattern extending between the first end and the second end. The bicycle headlight may include a battery carried by the elongate housing and coupled to the devices, and an arm extending from the elongate housing and to be coupled to the handlebar of the bicycle.

14 Claims, 13 Drawing Sheets

(56) References Cited

U.S. PATENT DOCUMENTS

| | | |
|---|---|---|
| 2012/0281422 A1 | 11/2012 | Lee |
| 2013/0033884 A1 | 2/2013 | Lo et al. |
| 2015/0131277 A1* | 5/2015 | Li .......................... F21V 29/74 |
| | | 362/218 |
| 2015/0239518 A1 | 8/2015 | Lee et al. |
| 2019/0100265 A1* | 4/2019 | Shulman ................... B62J 6/00 |
| 2019/0127005 A1 | 5/2019 | Regnier et al. |

\* cited by examiner

BICYCLE HEADLIGHT WITH LINEAR LED DEVICES AND RELATED METHODS

TECHNICAL FIELD

The present disclosure relates to the field of bicycle accessories, and, more particularly, to a bicycle headlight and related methods.

BACKGROUND

Bicycling has become a popular sport in recent years. Because of the ever increasing demand for different bicycle designs that meet different standards for pleasure bicycling or strenuous cross-country bicycling, different bicycle designs are becoming more common place. Some of these designs are adapted for riders with particular handicaps, as well as for increased rider comfort, increased speed, such as used for racing bicycles, and for increasing endurance in cross-country bicycling.

With the growth in the sport of bicycling, the bicycling accessories industry has also experienced tremendous growth. A common bicycle accessory is a headlight. In the earliest approaches to the bicycle headlight, the devices included incandescent light sources of low brightness. Some of the early approaches were battery based, or deployed a generator using mechanical energy from the drivetrain of the bicycle.

Some approaches switched out the incandescent light source for a light emitting diode (LED) device. The earliest approaches with LED devices suffered from low brightness, and poor battery life. To this end, many bicycle headlights provided little forward illumination and merely provided a safety function for the user at night.

SUMMARY

Generally, a bicycle headlight is to be coupled to a handlebar of a bicycle. The bicycle headlight also may include an elongate housing having a first end and a second end opposite the first end, and a plurality of LED devices carried by the elongate housing and being aligned in at least one pattern extending between the first end and the second end. The bicycle headlight may include a battery carried by the elongate housing and coupled to the plurality of LED devices, and at least one arm extending from the elongate housing and to be coupled to the handlebar of the bicycle. Advantageously, the bicycle headlight may provide improved brightness for night bicycling.

More specifically, the elongate housing may comprise an LED housing carrying the plurality of LED devices, and a battery housing coupled to the LED housing and carrying the battery. The bicycle headlight may further comprise a glare shield extending from the LED housing. The LED housing may comprise a plurality of fins extending outward from an outer surface thereof.

In some embodiments, the battery housing may comprise a tubular housing. Each of the plurality of LED devices may comprise an LED, and a lens receiving an output of the LED. The respective lens of the plurality of LED devices may comprise differing lens types. The at least one arm may comprise first and second opposing C-shaped clamps. The bicycle headlight may further comprise a user input switch coupled to the plurality of LED devices and configured to selectively set a brightness level of the plurality of LED devices. The bicycle headlight may further comprise a tripod mount coupled to the elongate housing.

Another aspect is directed to a method for making a bicycle headlight to be coupled to a handlebar of a bicycle. The method may include forming an elongate housing having a first end and a second end opposite the first end, and coupling a plurality of LED devices carried by the elongate housing and being aligned in at least one pattern extending between the first end and the second end. The method may comprise coupling a battery carried by the elongate housing and to the plurality of LED devices, and coupling at least one arm to extend from the elongate housing and to the handlebar of the bicycle.

DETAILED DESCRIPTION

The present disclosure will now be described more fully hereinafter with reference to the accompanying drawings, in which several embodiments of the invention are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout, and base 100 reference numerals are used to indicate similar elements in alternative embodiments.

Referring initially to FIGS. 1-6, a bicycle headlight 100 according to the present disclosure is now described. The bicycle headlight 100 is illustratively coupled to a handlebar 101 of a bicycle. Of course, the bicycle headlight 100 can be used in other applications, such as photography and general purpose illumination (e.g. a handheld flashlight). In other words, the bicycle headlight 100 may comprise a general purpose lighting device.

The bicycle headlight 100 illustratively comprises an elongate housing 102 having a first end 103 and a second end opposite 104 the first end. The elongate housing 102 comprises an LED housing 105 defining an uppermost end, and a battery housing 106 coupled to the LED housing and defining a lowermost end. In the illustrated embodiment, the LED housing 105 and the battery housing 106 are substantially straight (i.e. less than 0.25 inches of vertical travel for every 5 inches of lateral travel) between the first end 103 and the second end 104, but in other embodiments, the LED housing is inwardly curved (i.e. concave) between the first end and the second end to collimate the light projection. In yet other embodiments, the LED housing 105 is outwardly curved (i.e. convex) between the first and second end to expand light projection.

The bicycle headlight 100 illustratively comprises a plurality of LED devices 110a-110h carried by the LED housing 105 and being aligned in one of more patterns extending between the first end 103 and the second end 104. For embodiments with the curved LED housing 105, the one or more linear patterns comprise curvilinear patterns. In particular, in the illustrated embodiment, each of the plurality of LED devices 110a-110h is collinear. Of course, in other embodiments, the plurality of LED devices 110a-110h may not be collinear and have other patterns, such as staggered and nonlinear patterns. In the illustrated embodiment, the plurality of LED devices 110a-110h comprises eight LED devices, but this number can be changed in other embodiments and depending on the application. In some applications, the plurality of LED devices 110a-110h may comprise differing LED devices emitting in respective different frequency ranges, such as white visible light, and red visible light.

Figure 4:
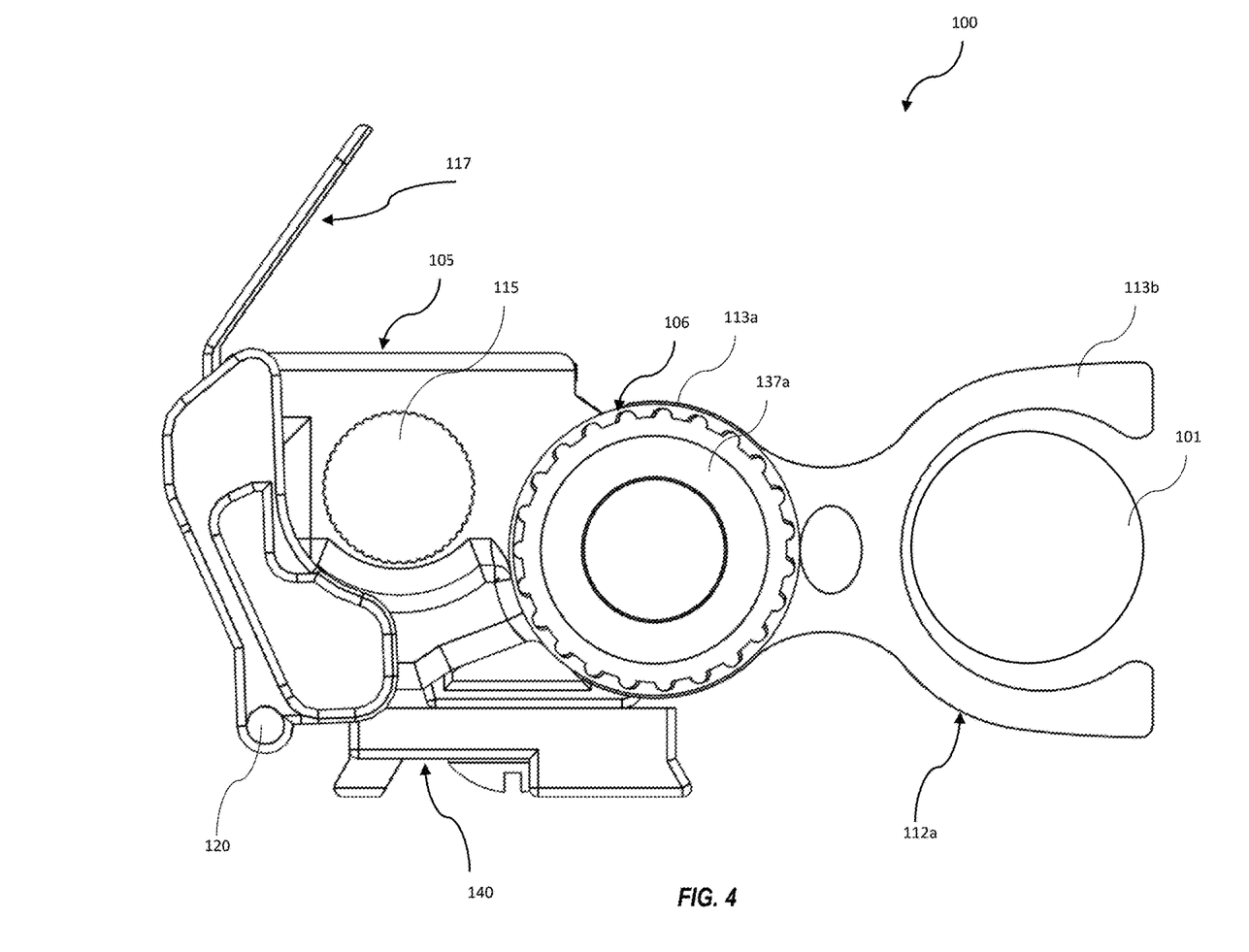
FIG. 4 is a schematic left side view of the bicycle headlight of FIG. 1.
Figure 5:
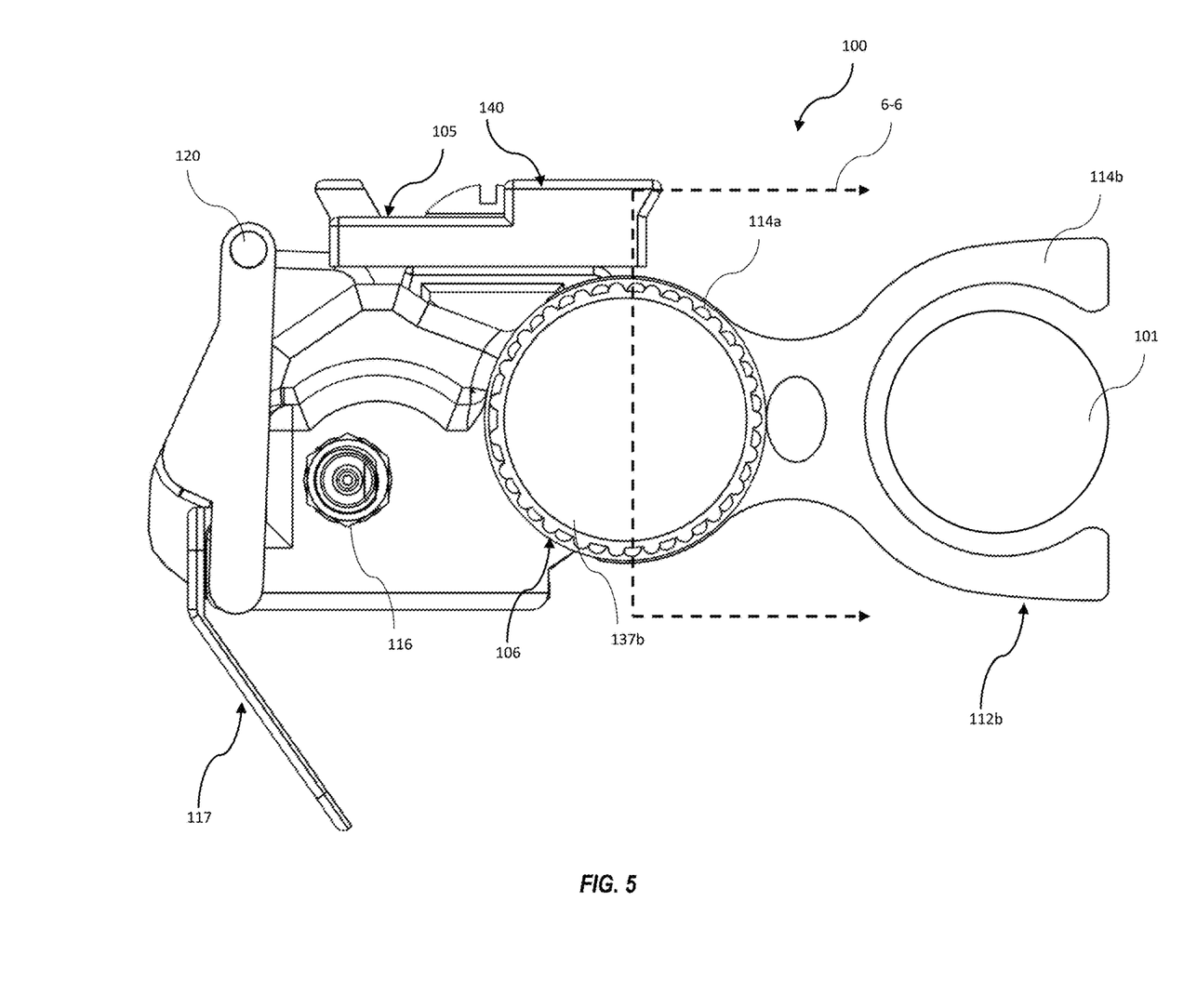
FIG. 5 is a schematic right side view of the bicycle headlight of FIG. 1.

As perhaps best seen in FIGS. 4-5, the battery housing 106 illustratively comprises a tubular housing. The bicycle headlight 100 illustratively includes a plurality of batteries/battery cells 111a-111d carried by the battery housing 106 and coupled to the plurality of LED devices 110a-110h. The plurality of batteries/battery cells 111a-111d is illustratively coupled in series. In other embodiments, the plurality of batteries/cells 111a-111d may be readily replaced with a single battery, such as a Lithium ion battery sized to fit the battery housing 106. The battery housing 106 may comprise a dampening material carried with the tubular housing to cushion the plurality of batteries/battery cells 111a-111d. This dampening material prevents rattling of and damage to the plurality of batteries/battery cells 111a-111d, and also prevents unexpected electrical discontinuities in the connection due to a bumpy ride surface.

Figure 1:
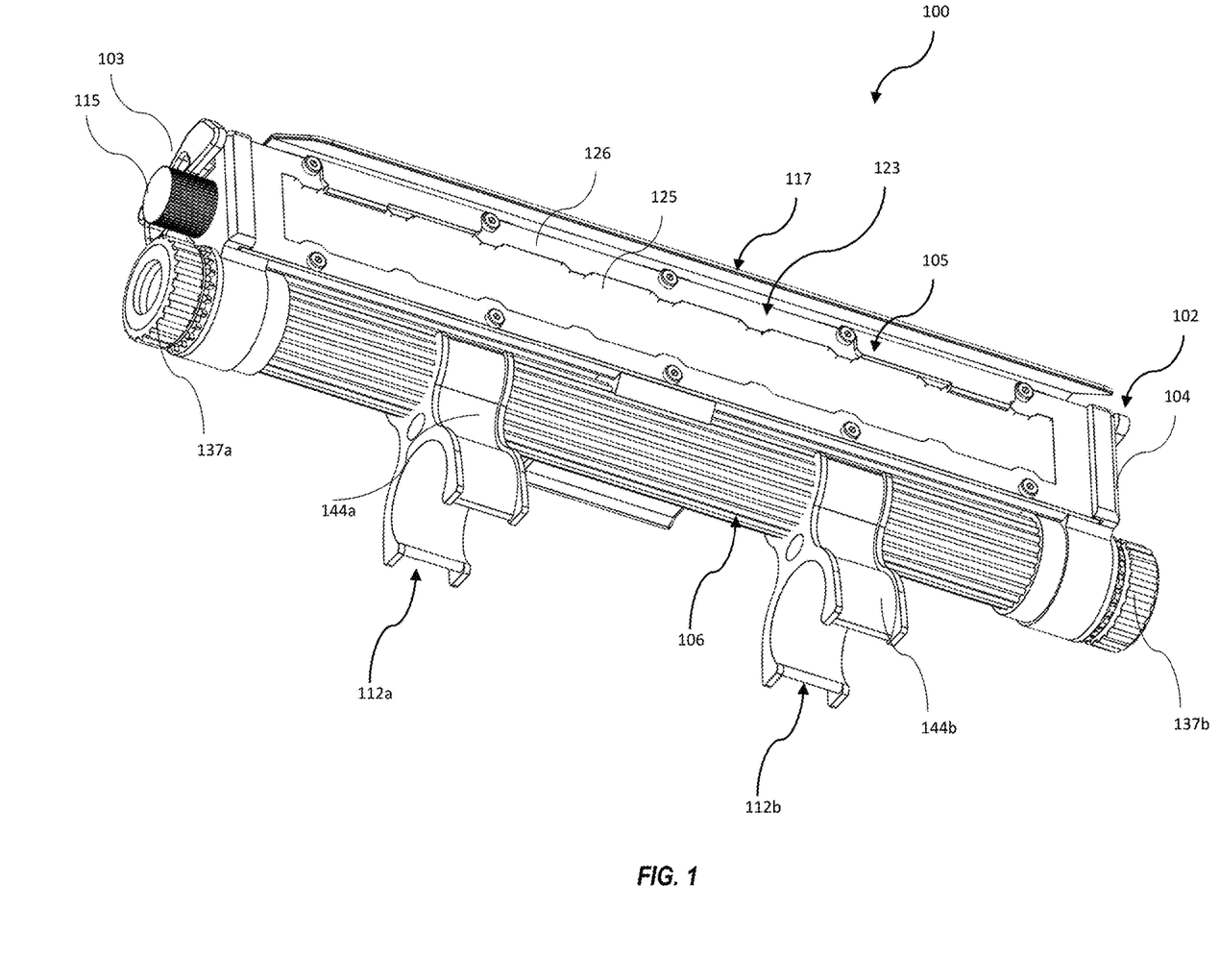
FIG. 1 is a schematic perspective view of a bicycle headlight, according to the present disclosure.
Figure 6:
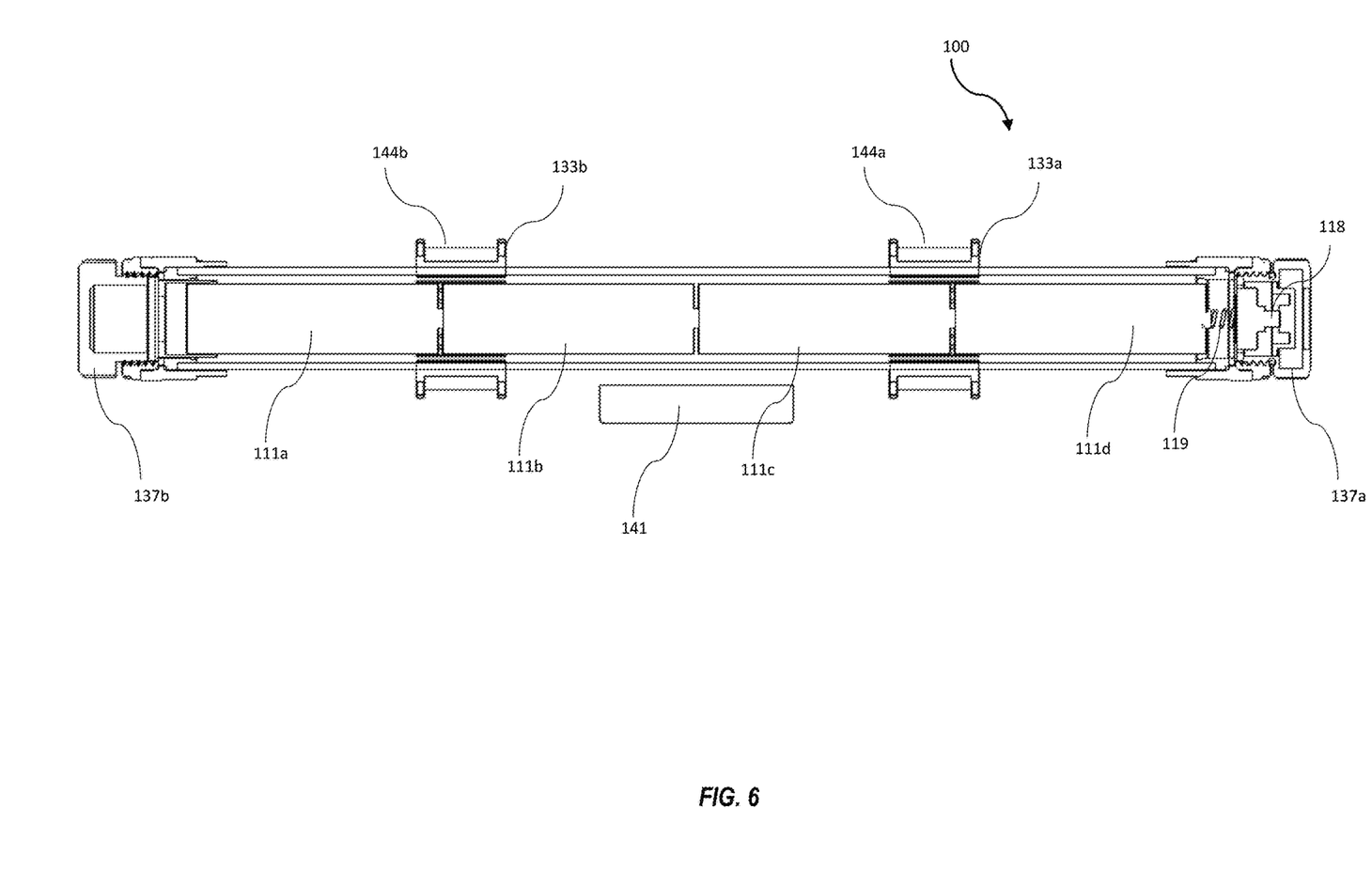
FIG. 6 is a schematic cross-sectional view of the bicycle headlight of FIG. 1 along line 6-6 of FIG. 5.

The bicycle headlight 100 illustratively includes first and second arms 112a-112b extending from the battery housing 106 and to be coupled to the handlebar 101 of the bicycle. Of course, in other embodiments, the bicycle headlight 100 may include a single arm. Each arm 112a-112b illustratively comprises first and second opposing C-shaped clamps 113a-113b, 114a-114b (i.e. providing for a dog bone shape).

The bicycle headlight 100 illustratively includes a user input switch 115 coupled to the plurality of LED devices 110a-110h and configured to selectively set a brightness level of the plurality of LED devices. In the illustrated embodiment, the user input switch 115 comprises a rotary switch carried to the first end 103 of the LED housing 105 configured to provide a dimmer functionality for the plurality of LED devices 110a-110h. The bicycle headlight 100 illustratively includes a connection port 116 coupled to the second end 104 of the LED housing 105. In some embodiments, the bicycle headlight 100 comprises a power toggle switch (not shown), for example, a push button toggle switch mounted adjacent to the connection port 116. The battery housing 106 illustratively comprises an output contact terminal 118 connected to output of the series coupled plurality of batteries/battery cells 111a-111d, and an elastic spring device 119 coupled between the batteries/battery cells and the output contact terminal configured to maintain solid electrical contact therebetween. The connection port 116 is used to charge the plurality of batteries/battery cells 111a-111d and/or provide an option for connecting an external power source (e.g. AC/DC power adapter or external battery).

As will be appreciated, in some embodiments, the power toggle switch may selectively toggle the output contact terminal 118 between first state connecting electrical power and a second state disconnecting electrical power. In some embodiments, the power toggle switch may be omitted and integrated within the user input switch 115 (e.g. with a rotary dimmer switch, rotate to dim and power toggle, or rotate and then push to power toggle). Of course, the illustrated placements of the user input switch 115 and the power toggle switch are exemplary, and they can be placed in other locations. The input switch 115 can have either a linear non-detented functionality that allows infinite adjustment of brightness by rotating it, or it can have multiple detents in the rotation range to provide pre-programmed brightness level at each detent location when selected.

In yet other embodiments, the user input switch 115 and the power toggle switch may be carried by a remote device separate from the bicycle headlight 100. The remote device may be wired or wireless (e.g. connecting via Bluetooth). In some embodiments, the remote device may comprise a mobile cellular device executing a mobile application.

In some embodiments, the bicycle headlight 100 may comprise a breather valve (not shown) carried by the battery housing 106. The breather valve is configured to allow expansion and contraction of the air inside the elongate housing 102 as it heats up and cools down without breathing in moisture.

The bicycle headlight 100 illustratively comprises a glare shield 117 extending from the LED housing 105. The glare shield 117 is removable from the LED housing 105, and comprises a hinge 120 coupling the glare shield to the LED housing. The hinge 120 permits the glare shield 117 to rotate about the hinge and selectively dampen projection from the plurality of LED devices 110a-110h. In other embodiments, the glare shield 117 has a fixed coupling and does not rotate or pivot.

Figure 2:
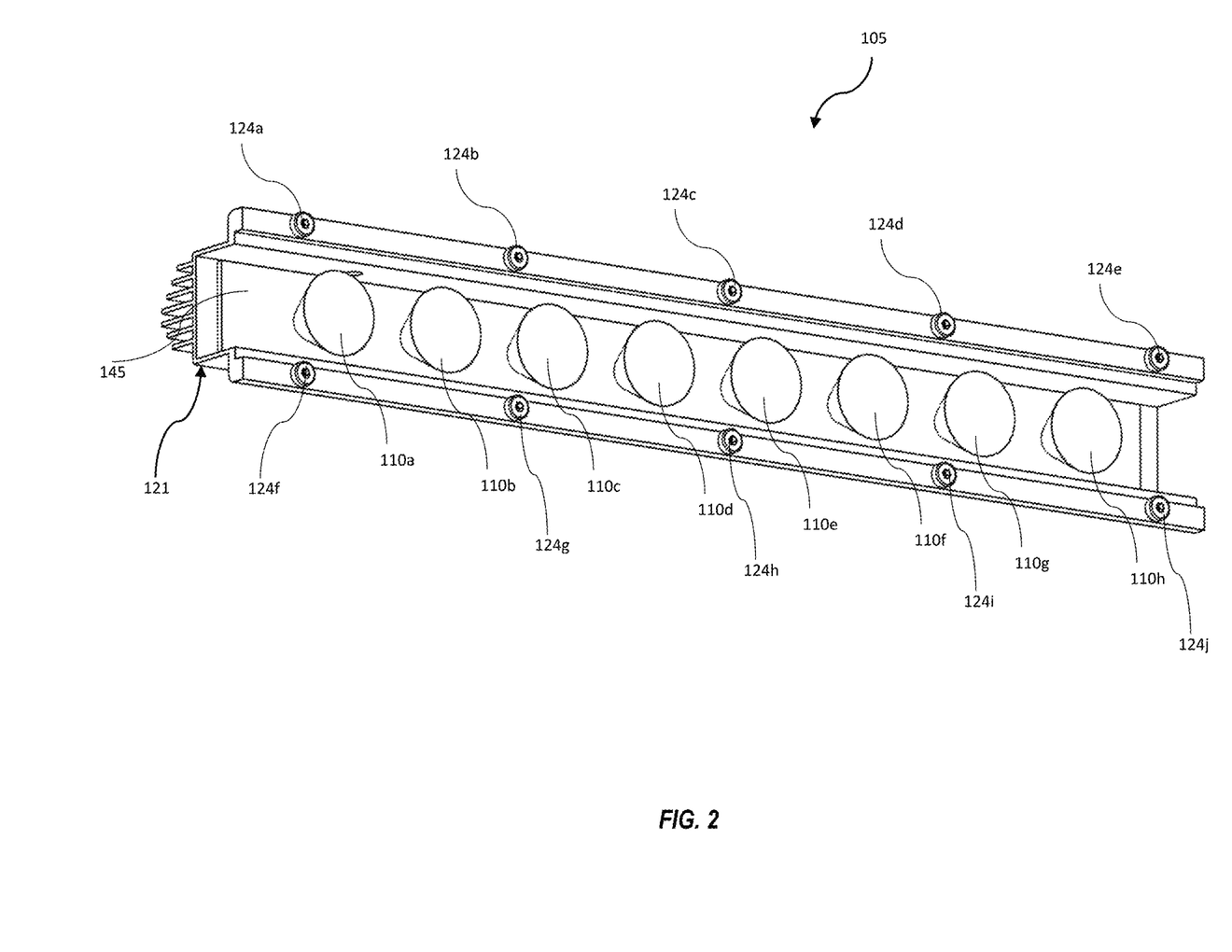
FIG. 2 is a schematic perspective view of an LED housing from the bicycle headlight of FIG. 1.
Figure 3:
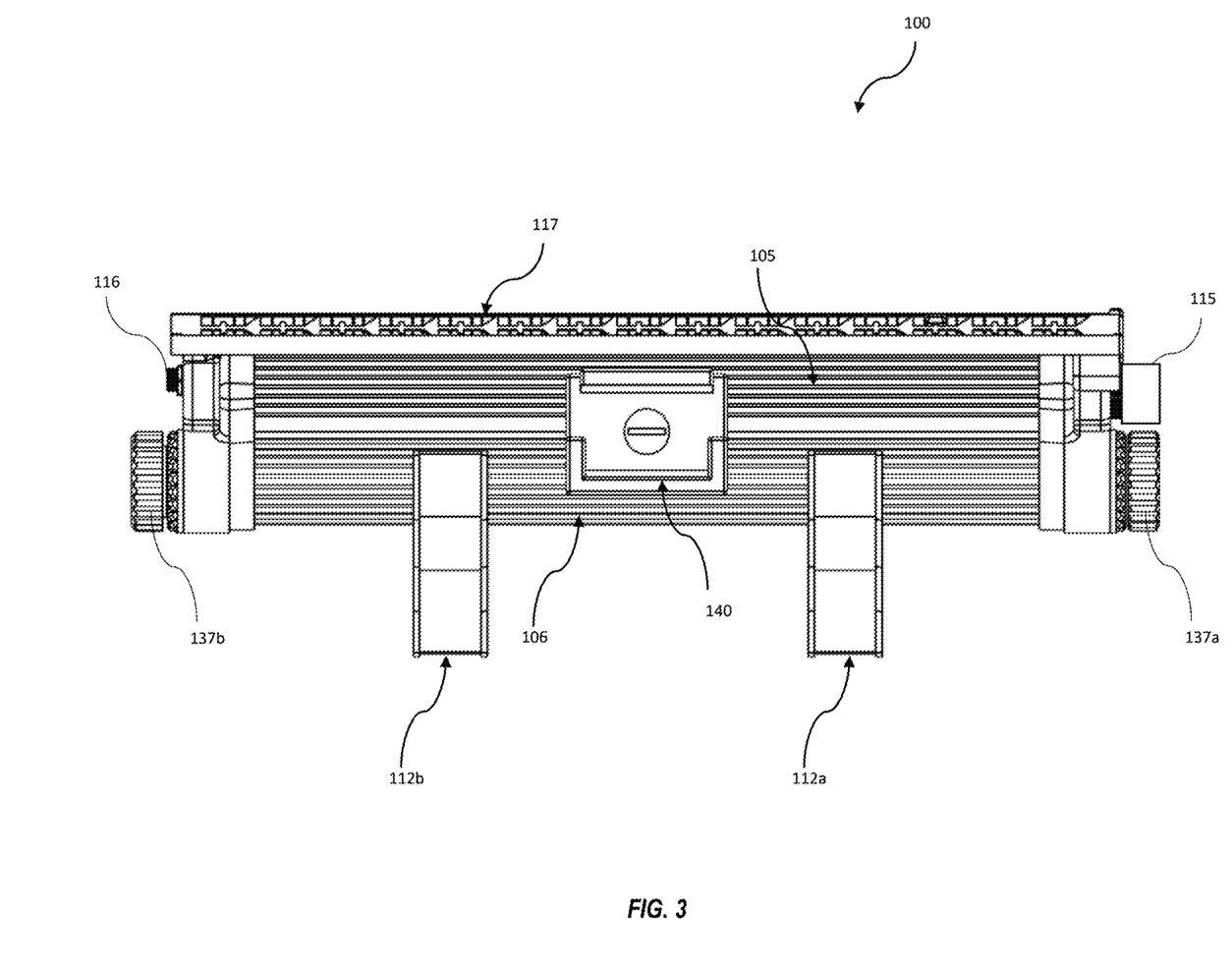
FIG. 3 is a schematic back side view of the bicycle headlight of FIG. 1.

The LED housing 105 illustratively includes a back plate 121 defining a longitudinal slot 122 extending between the first end 103 and the second end 104. The plurality of LED devices 110a-110h is carried within the longitudinal slot 122. The LED housing 105 illustratively includes a front plate 123, and a plurality of fasteners 124a-124j (e.g. threaded screws) coupling the front plate to the back plate. The front plate 123 comprises a transparent cover 125, and a frame 126 surrounding the transparent cover and receiving the plurality of fasteners 124a-124j. The transparent cover 125 may comprise chemically hardened glass, or a polymer plastic, for example.

Figure 7:
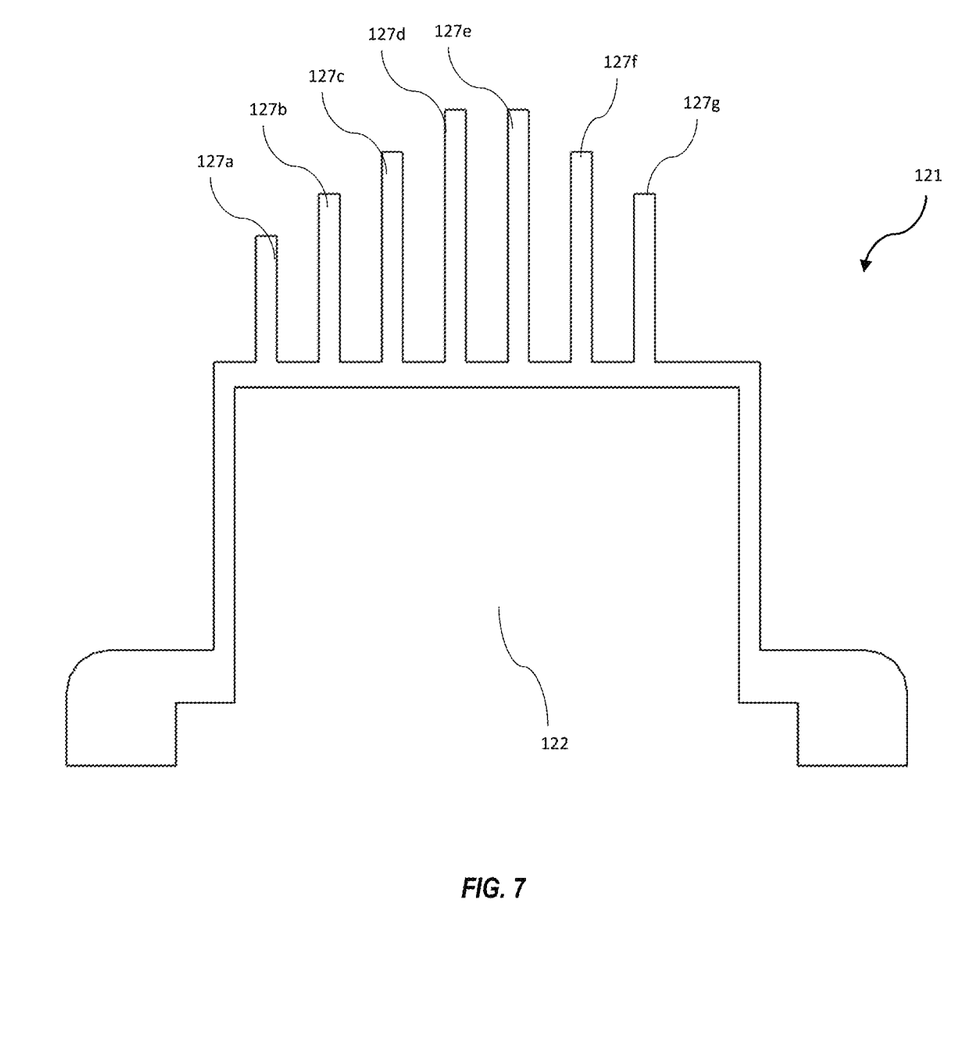
FIG. 7 is a schematic right side view of a back plate of the LED housing from the bicycle headlight of FIG. 1.

Referring now additionally to FIG. 7, the LED housing 105 illustratively comprises a plurality of fins 127a-127g extending outward from an outer surface thereof. The plurality of fins 127a-127g illustratively comprises substantially parallel fins (i.e. ±10° from parallel) extending linearly. In other embodiments, the plurality of fins 127a-127g may extend radially. The plurality of fins 127a-127g comprises fins of differing lengths. Advantageously, the plurality of fins 127a-127g is configured to serve as a heat sink and maintain the LED housing 105 at a desired operating temperature.

Figure 8:
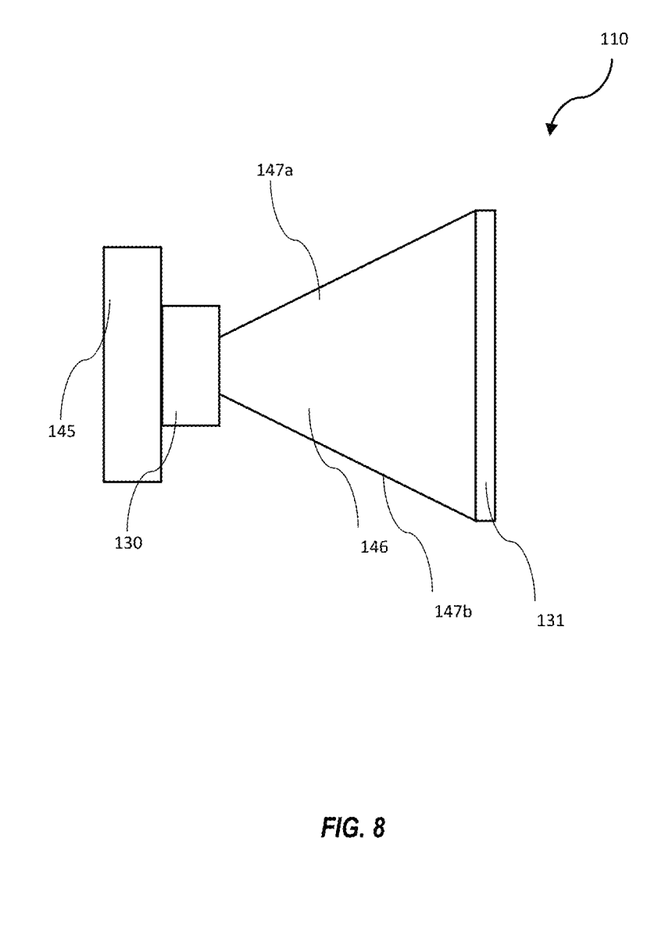
FIG. 8 is a schematic diagram of an LED device from the bicycle headlight of FIG. 1.

Referring now additionally to FIG. 8, each of the plurality of LED devices 110a-110h illustratively includes an LED 130, a lens 131 receiving an output of the LED, and a lens holder 146 carrying the lens. The lens holder 146 may comprise reflective focusing surfaces 147a-147b for the output of the LED 130.

The respective lens 131 of the plurality of LED devices 110a-110h comprise differing lens types. In some embodiments, the plurality of LED devices 110a-110h comprises a set of wide elliptical lenses, and a set of narrow spot light lenses. The respective lens 131 can be replaced by the user, to customize the light pattern, maximum beam distance, and suit different terrains and riding styles. The bicycle headlight 100 has optical lenses to focus the light, but some embodiments of the bicycle headlight include a functional light projection without optical lenses.

Figure 9:
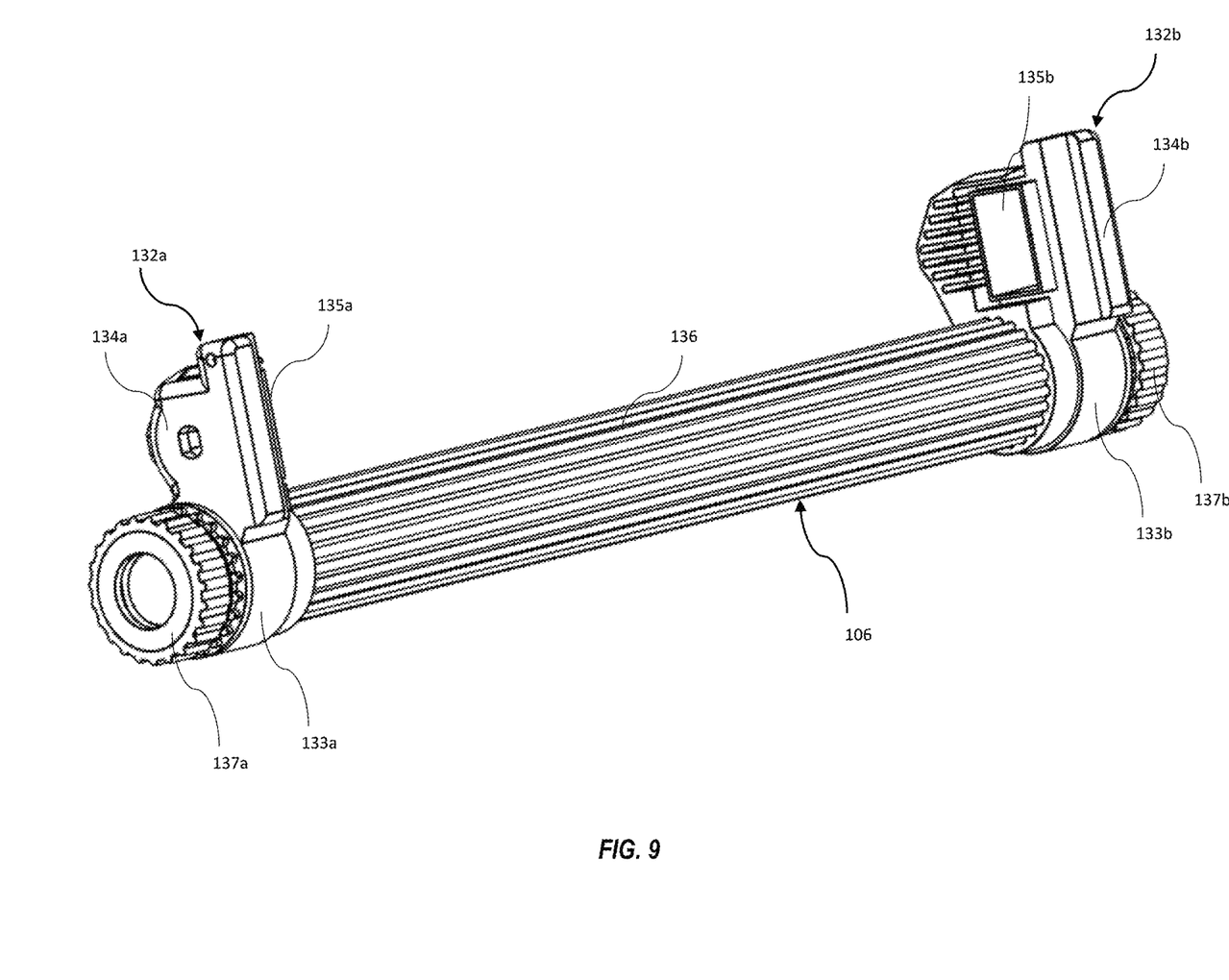
FIG. 9 is a schematic perspective view of a battery housing, and first and second endcaps from the bicycle headlight of FIG. 1.

Referring now additionally to FIG. 9, the bicycle headlight 100 illustratively includes first and second end caps 132a-132b coupled respectively to the first and second ends 103, 104 of the battery housing 106. The first and second end caps 132a-132b coupled to the back plate 121 via one or more of fasteners, adhesive material bonding, and rubber gaskets.

In particular, each of the first and second end caps 132a-132b comprises a ring 133a-133b receiving the battery housing 106. In the illustrated embodiment, the battery housing 106 comprises a plurality of longitudinal ribs on an outer radial edge thereof, and each ring 133a-133b comprises respective grooves for receiving the plurality of longitudinal ribs to provide an interference locking mechanism. Of course, in other embodiments, the interference locking mechanism and rib-groove features can be replaced with other fixation approaches, such as an adhesive bond.

Also, each of the first and second end caps 132a-132b comprises an arm 134a-134b extending from the ring 133a-133b and defining respective recesses 135a-135b receiving respectively the first and second ends 103, 104 of the LED housing 105. The first and second end caps 132a-132b also comprise an electrical coupling between the LED housing 105 and the battery housing 106. The first and second end caps 132a-132b also carry the user input switch 115 and may also carry the power toggle switch, which are also coupled to the electrical coupling. The battery housing 106 illustratively includes a tubular body 136, and first and second tube caps 137a-137b threadingly coupled to the tubular body.

Figure 11:
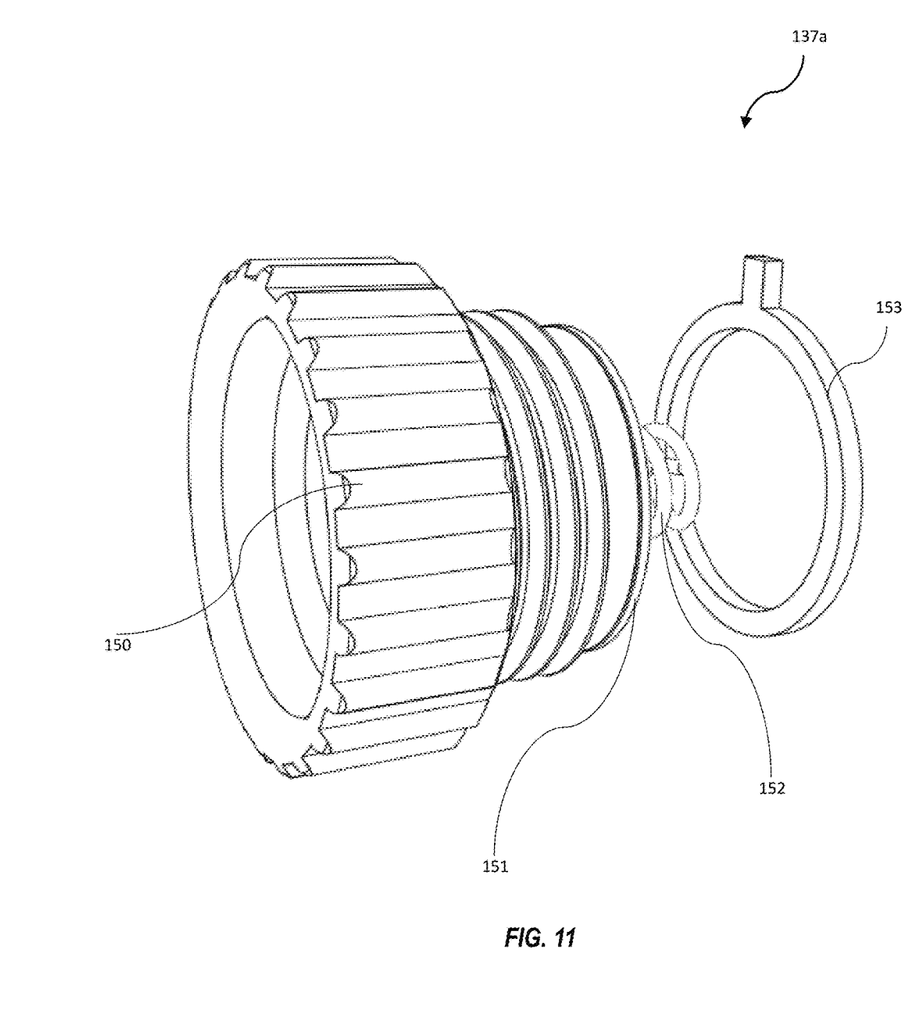
FIG. 11 is a schematic exploded view of a tube cap from the bicycle headlight of FIG. 1.
Figure 12:
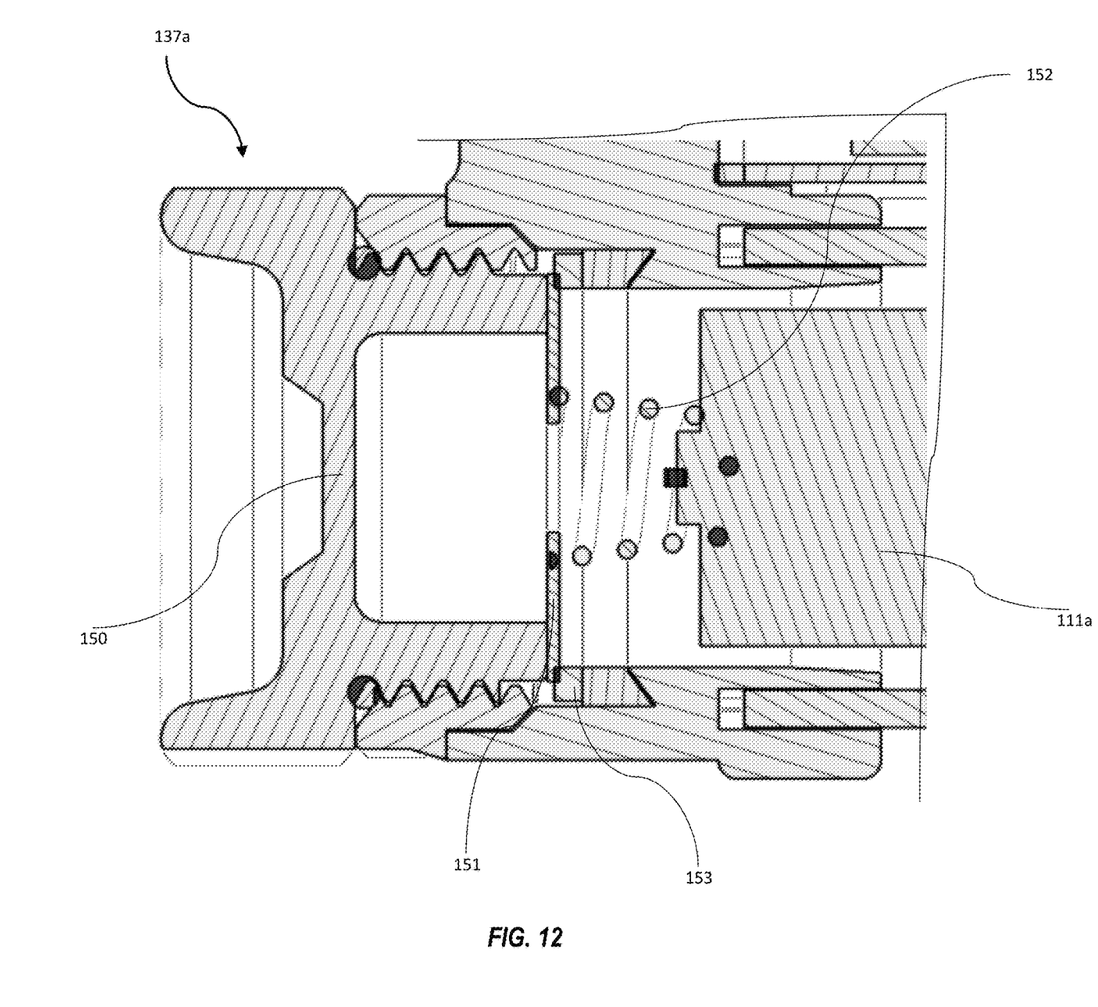
FIG. 12 is a partial schematic cross-sectional view of the tube cap from the bicycle headlight of FIG. 1 along line 6-6 of FIG. 5.

Referring now additionally to FIGS. 11-12, the second tube cap 137a illustratively includes a circular body 150, and a circular plate 151 made from conductive material, such as copper, and attached to the circular body 150. The tube cap 137a illustratively includes a coil spring element 152 made from conductive material (e.g. copper) and attached to the circular plate 151. FIG. 11 shows a circular ring 153, with a hole in the center of it (similar to a washer), located captively inside the battery housing 106, with compressible material behind it. The circular ring 153 has a larger outside diameter than the circular plate 151 to keep it captive inside the battery housing 106. The opening in the circular ring 153 has a smaller diameter than the outside diameter of the circular plate 151, so that the circular plate will provide a landing surface for the circular ring 153 when pressed against it. A conductive wire is attached to the circular ring 153 with the other end of the wire attached to the controller. When the second tube cap 137a is screwed into the end cap, the circular plate 151 makes contact with the circular ring 153 while at the same time making contact with the battery end, thereby conducting electricity from the battery to the controller. This layout is repeated at the other end of the bicycle headlight 100 (i.e. the first tube cap 137b) to complete the electrical circuit when both tube caps 137a-137b are screwed into place. The coil spring element 152 can also be a formed plate that acts as a conductive spring element.

Figure 10:
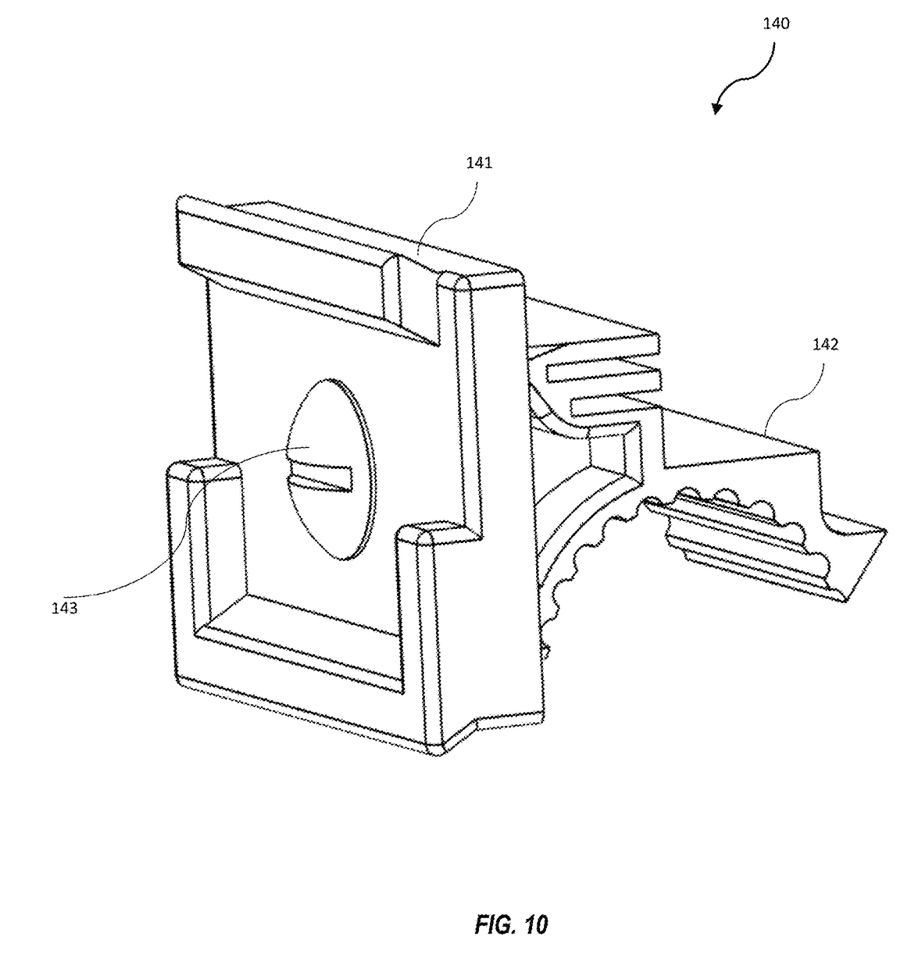
FIG. 10 is a schematic perspective view of a tripod mount from the bicycle headlight of FIG. 1.

Referring now additionally to FIG. 10, the bicycle headlight 100 illustratively includes a tripod mount 140 coupled to the elongate housing 102. The tripod mount 140 illustratively includes a mount body 141, a curved arm 142 coupled to the mount body, and a fastener 143 coupling the mount body to the curved arm. The curved arm defines an inner surface with grooves for receiving the plurality of longitudinal ribs of the battery housing 106 to provide an interference locking mechanism. Of course, in other embodiments, the interference locking mechanism and rib-groove features can be replaced with other fixation approaches, such as an adhesive bond.

Referring again to FIGS. 1 and 6, each of the first and second arms 112a-112b defines an outer channel 144a-144b for receiving a respective strap (not shown). The strap wraps around the outer channel 144a-144b and between the LED housing 105 and the battery housing 106. The strap also wraps around the handlebar 101 of the bicycle to provide a coupling thereto.

As perhaps best seen in FIG. 1, the first opposing C-shaped clamps 113a, 114a of the first and second arms 112a-112b have an inner radial surface with grooves for receiving the plurality of longitudinal ribs of the battery housing 106 to provide an interference locking mechanism. Of course, in other embodiments, the interference locking mechanism and rib-groove features can be replaced with other fixation approaches, such as an adhesive bond. The first opposing C-shaped clamps 113a, 114a also slide longitudinally along the length of the battery housing 106. Helpfully, the bicycle headlight 100 is readily rotated about the handlebar 101 of the bicycle. Also, the interference locking mechanism between the battery housing 106 and the first opposing C-shaped clamps 113a, 114a of the first and second arms 112a-112b is releasable, permitting the bicycle headlight 100 to be readily rotated about the battery housing. In other words, the user has significant flexibility in directing the output of the bicycle headlight 100. These two degrees of freedom, coupled with the tilting of the bicycle headlight 100 within the ribs, and tilting the whole assembly around the handlebar axis, enable fitment to a wide variety of handlebar geometries, and enables adjustment of the bicycle headlight to enable fitment of additional accessories to the handlebar 101.

Figure 13:
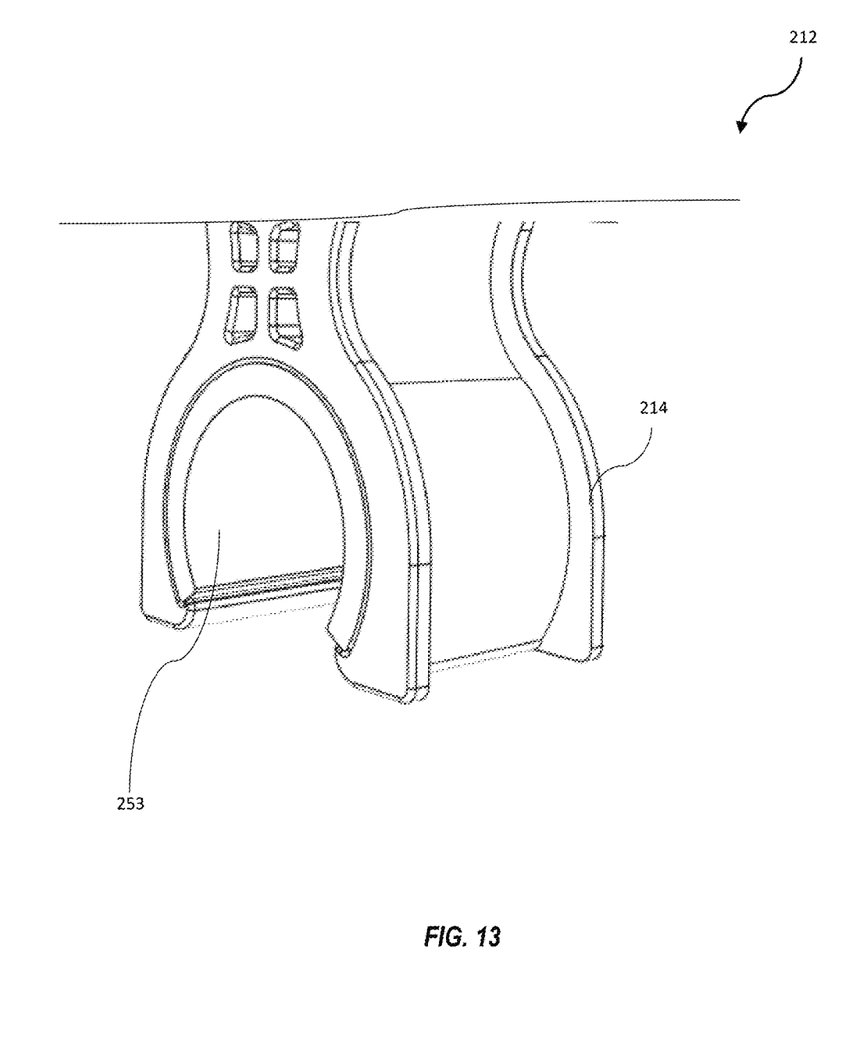
FIG. 13 is a schematic perspective view of an arm from another embodiment of the bicycle headlight, according to the present disclosure.

As perhaps best seen in FIGS. 4-5, the second opposing C-shaped clamps 113b, 114b of the first and second arms 112a-112b are fitted over the handlebar 101 of the bicycle. In the illustrated embodiment, the bicycle headlight 100 is coupled to the handlebar by the strap wrapping around the outer channel 144a-144b. For example, the straps may comprise hook and loop straps, metal cam straps, plastic cam straps, or strap adjustor straps. In other embodiments, the bicycle headlight 100 is coupled to the handlebar by a plurality of fasteners carried by the second opposing C-shaped clamps 113b, 114b of the first and second arms 112a-112b. Also, in some embodiments (FIG. 13), the second opposing C-shaped clamps 113b, 114b of the first and second arms 112a-112b comprise a flexible layer (253: FIG. 13) (e.g. foam layer) carried thereby to abut the handlebar 101.

In yet other embodiments, the bicycle headlight 100 is coupled to the handlebar by a compression lock mechanism carried by the second opposing C-shaped clamps 113b, 114b of the first and second arms 112a-112b. Here, the second opposing C-shaped clamps 113b, 114b of the first and second arms 112a-112b would be compressed to retain the handlebar 101 of the bicycle.

As perhaps best seen in FIGS. 2 & 8, the bicycle headlight 100 illustratively comprises a circuit board 145 carrying the plurality of LED devices 110a-110h. The circuit board 145 comprises a controller (not shown) coupled to the plurality of LED devices 110a-110h, the plurality of batteries/battery cells 111a-111d (via the electrical coupling), the user input switch 115, and the power toggle switch. Indeed, in some embodiments, the controller is configured to operate the plurality of LED devices 110a-110h in a plurality of modes. In particular, the plurality of modes may comprise a high power mode where all of the plurality of LED devices 110a-110h are powered at maximum light output intensity, a low power mode where all of the plurality of LED devices are powered at minimum light output intensity, and varying modes where a subset of the plurality of LED devices is powered (e.g. only LED devices with spot light lenses are powered, only LED devices with certain color output are powered).

The circuit board 145 also may comprise circuitry for protection against reverse polarity damage to the plurality of LED devices 110a-110h, transient voltages, electromagnetic interface, electrostatic discharge and over-voltage, etc. The circuit board 145 also may comprise a temperature circuit (e.g. thermistor) coupled to the controller, and the controller is configured to temperature control the bicycle headlight 100. The light output is controlled in a closed-loop control system that reduces the light output and hence the heat generated before it reaches the maximum threshold operating temperature limit. Light output is reduced when measured temperature reaches a predetermined starting temperature (some value below the threshold temperature), output is then continuously controlled linearly down to a predetermined minimum light output level that will not further increase the temperature of the fixture. In this way, the threshold temperature is never exceeded. A second temperature measurement is taken on the PCB to ensure redundancy when the first thermistor fails.

The circuit board 145 is also configured to ensure that batteries are protected from excessive current draw and premature or unexpected shut-down at high brightness levels. As the plurality of batteries/battery cells 111a-111d is depleted, this is achieved by automatically reducing the output of the light at low battery voltages, regardless of the dimmer switch setting. This provides for a gradual reduction in light output and prevents unexpected shut-down of the light when the batteries get depleted. At very low battery voltage levels, the circuit board 145 will change the battery level indicator LED to amber, and then later to red, then flashing red, then the control system will provide short bursts of light blimping (short off blimps), to serve as warning to the user that the batteries/battery cells are depleted and light may shut down. At that point, the output will be reduced to minimum, which still provides adequate light output for general low speed navigation. When the circuit board 145 controls the output to protect the batteries/battery cells during low battery voltages, the controller will disable selection of higher brightness levels.

The elongate housing 102 may comprise a metallic material, a polymer plastic material, or a combination thereof. In particular, the back plate 121 of the LED housing 105 comprises a material with sufficient thermal conductivity, for example, aluminum. Also, to enhance thermal conductivity, the circuit board 145 is coupled to the back plate 121 with a thermally conductive adhesive or other suitable heat-transfer compound.

In some embodiments, the bicycle headlight 100 is waterproof and the elongate housing 102 seals interior compartments to an Ingress Protection Code 6X standards. Moreover, in some embodiments, the embodiment comprises an integrated or 1-piece elongate housing, providing even greater ingress protection.

Advantageously, the bicycle headlight 100 provides a greater brightness level than typical headlights. Moreover, the bicycle headlight 100 provides a rugged, integrated, no external wires approach that will be reliable for off road applications. Moreover, the bicycle headlight 100 carries a large battery pack, which allows for longer rides and less frequency battery replacement or recharging. Also, the bicycle headlight 100 is readily movable and rotatable about 2 separate longitudinal axes. The first and second arms 112a-112b of the bicycle headlight 100 permit the device to be installed on a great variety of bicycles.

Another aspect is directed to a method for making a bicycle headlight 100 to be coupled to a handlebar 101 of a bicycle. The method includes forming an elongate housing 102 having a first end 103 and a second end 104 opposite the first end, and coupling a plurality of LED devices 110a-110h carried by the elongate housing and being aligned in at least one linear pattern extending between the first end and the second end. The method comprises coupling a plurality of batteries 111a-111d carried by the elongate housing 102 and to the plurality of LED devices 110a-110h, and coupling first and second arms 112a-112b to extend from the elongate housing and to the handlebar 101 of the bicycle.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

That which is claimed is:

1. A bicycle headlight to be coupled to a handlebar, the bicycle headlight comprising:
    an elongate housing having a first end and a second end opposite said first end and comprising an LED housing, and a battery housing integrated with said LED housing;
    a plurality of light emitting diode (LED) devices carried by said LED housing and being aligned in at least one pattern extending between said first end and said second end, each of said plurality of LED devices comprising an LED, and a lens receiving an output of said LED;
    a battery carried by said battery housing and coupled to said plurality of LED devices; and
    first and second arms extending from said battery housing and to be coupled to the handlebar, each arm comprising first and second opposing C-shaped clamps.

2. The bicycle headlight of claim 1 further comprising a glare shield extending from said LED housing.

3. The bicycle headlight of claim 1 wherein said LED housing comprises a plurality of fins extending radially outward from an outer surface thereof.

4. The bicycle headlight of claim 1 wherein said battery housing comprises a tubular housing.

5. The bicycle headlight of claim 1 wherein the respective lens of said plurality of LED devices comprise differing lens types.

6. The bicycle headlight of claim 1 further comprising a user input switch coupled to said plurality of LED devices and configured to selectively set a brightness level of said plurality of LED devices.

7. The bicycle headlight of claim 1 further comprising a tripod mount coupled to said elongate housing.

8. A method for making a bicycle headlight to be coupled to a handlebar, the method comprising:
 forming an elongate housing having a first end and a second end opposite the first end, the elongate housing comprising an LED housing, and a battery housing coupled to the LED housing;
 coupling a plurality of light emitting diode (LED) devices carried by the LED housing and being aligned in at least one pattern extending between the first end and the second end, each of the plurality of LED devices comprising an LED, and a lens receiving an output of the LED;
 coupling a battery carried by the battery housing and to the plurality of LED devices; and
 coupling first and second arms to extend from the battery housing and to the handlebar, each arm comprising first and second opposing C-shaped clamps.

9. The method of claim 8 further comprising coupling a glare shield to extend from the LED housing.

10. The method of claim 8 wherein the LED housing comprises a plurality of fins extending radially outward from an outer surface thereof.

11. The method of claim 8 wherein the battery housing comprises a tubular housing.

12. The method of claim 8 wherein the respective lens of the plurality of LED devices comprise differing lens types.

13. The method of claim 8 further comprising coupling a user input switch to the plurality of LED devices and configured to selectively set a brightness level of the plurality of LED devices.

14. The method of claim 8 further comprising coupling a tripod mount to the elongate housing.

\* \* \* \* \*